(12) United States Patent
Hennessy

(10) Patent No.: US 7,453,342 B1
(45) Date of Patent: Nov. 18, 2008

(54) METHOD OF CONTROLLING AND STABILIZING LASER OUTPUT

(76) Inventor: Michael J. Hennessy, 9 Patroon Pl., Ballston Lake, NY (US) 12019

(*) Notice: Subject to any disclaimer, the term of this patent is extended or adjusted under 35 U.S.C. 154(b) by 214 days.

(21) Appl. No.: 10/971,370

(22) Filed: Oct. 22, 2004

Related U.S. Application Data

(60) Provisional application No. 60/514,512, filed on Oct. 27, 2003.

(51) Int. Cl.
*H01F 5/00* (2006.01)

(52) U.S. Cl. ............... 335/296; 335/216; 335/299; 310/90.5

(58) Field of Classification Search ............ 335/216, 335/296, 299; 310/90.5; 104/281–286
See application file for complete search history.

(56) References Cited

U.S. PATENT DOCUMENTS

| | | | | |
|---|---|---|---|---|
| 5,170,715 A | * | 12/1992 | Gran et al. | 104/284 |
| 5,267,091 A | * | 11/1993 | Chen | 359/872 |
| 5,332,987 A | * | 7/1994 | Hennessy et al. | 335/216 |
| 5,686,876 A | * | 11/1997 | Yamamoto et al. | 335/216 |
| 2004/0244492 A1 | * | 12/2004 | Berstis | 73/653 |

* cited by examiner

*Primary Examiner*—Ramon M Barrera
(74) *Attorney, Agent, or Firm*—Leonard Cooper

(57) ABSTRACT

This invention describes a means by which lasers and laser beam controllers mounted on moving vehicles or other unstable platforms can be isolated from vibrations. By magnetically levitating the entire laser or just the beam controller hardware, targeting efficiency can be vastly improved. Superconducting levitation and control coils can be used to reduce added power losses. Cryogenic power conversion systems can be employed to drive the levitation system. The laser could also be cryogenically cooled, depending on the type of laser employed.

18 Claims, 3 Drawing Sheets

METHOD OF CONTROLLING AND STABILIZING LASER OUTPUT

This patent claims the benefit of provisional patent application 60/514,512 filed Oct. 27, 2003.

BACKGROUND OF THE INVENTION

Laser weapons systems mounted on moving vehicles such as ships, airplanes, or trucks are often plagued by vibrational problems. Laser beams from these systems are very difficult to control accurately. Shocks and vibrations from the terrain and even from the mechanical connection of the vehicle to its own motor can make precision aiming nearly impossible.

SUMMARY OF THE INVENTION

The proposed solution to this problem is to magnetically levitate and suspend the beam control system and/or the laser itself above the vehicle surface. This isolates laser hardware from vibration and noise caused by or encountered by the underlying moveable platform, be it a ground vehicle, aircraft or naval ship. The combination of the variable magnetic field and active feedback control from motion sensors (gyros, accelerometers, etc.) provides an active suspension system with an electrically adjustable spring constant. For this application, the magnetic spring constant could be very soft, attenuating the noise and vibration that would ordinarily overwhelm the beam control system. Electrically controlled active damping eliminates oscillations and provides stability.

Depending on the size and weight of the laser hardware, a combination of one or several superconducting magnets with properly positioned permanent magnets would lift the beam control hardware and allow it to ride above the underlying platform within some small distance. (This distance is typically called a "gap", and is related to the anticipated range in differential motion.) Smaller superconducting magnets or copper coils would be used to provide fine motion control. Superconducting magnets have the advantage of providing sufficient magnetic force without consuming an inordinate amount of power. The magnets are also relatively lightweight and provide little overhead, especially for systems where a cryogenic platform is already available. If superconducting magnets are employed for the primary lift, they could be put in the "persistent mode" with unchanging supercurrents, requiring no power at all except that of refrigeration. Most of the electric power required to compensate for vehicle disturbances is consumed in generating magnetic fields in the control coils. This power can be delivered very efficiently using cryopower modules currently under development by MTECH Laboratories. The cryopower concept takes advantages of the high efficiencies of certain electronics elements and superconductors at low temperature. The laser could also be cryogenically cooled. For example, a cryogenically diode laser array could be utilized as either the primary laser source or as a laser pump for a solid-state laser.

DESCRIPTION OF THE PREFERRED EMBODIMENTS

Figure 1:
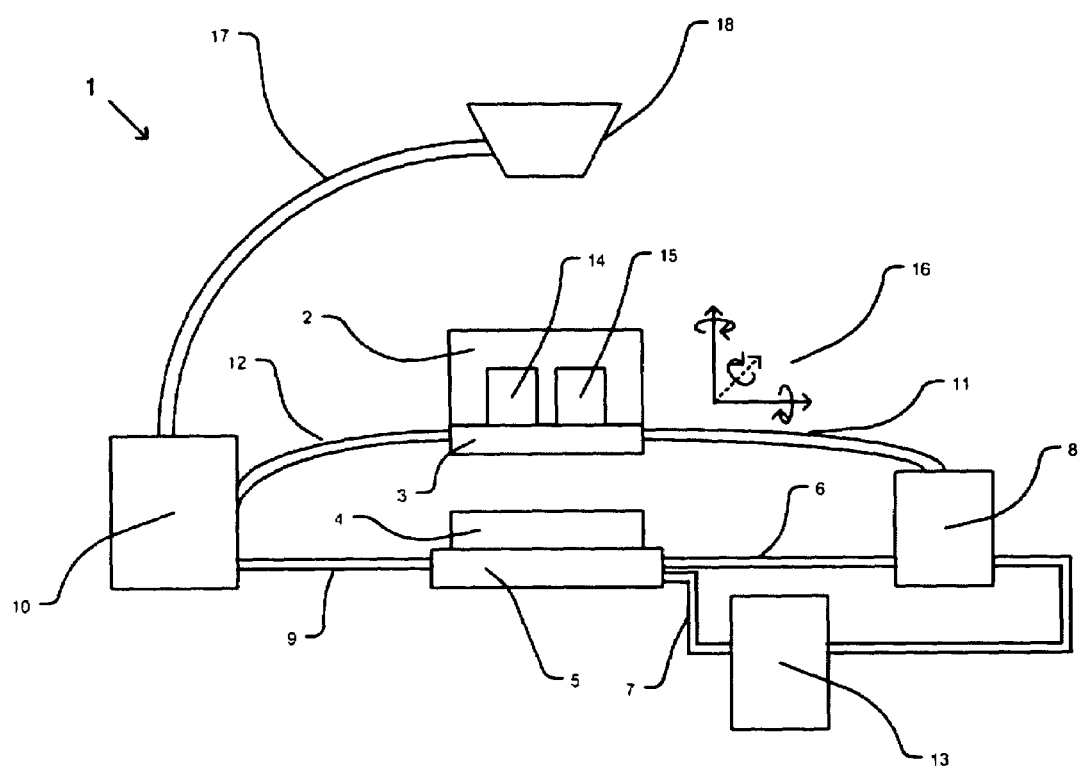
FIG. 1 shows the levitated beam controller concept 1, in which a primary apparatus 2 containing a magnet 3 is levitated above and by a base 5 containing control coils 4, which can be either superconducting coils or copper coils. The primary apparatus could house a cryogenic or non-cryogenic high-power laser.
Figure 2:
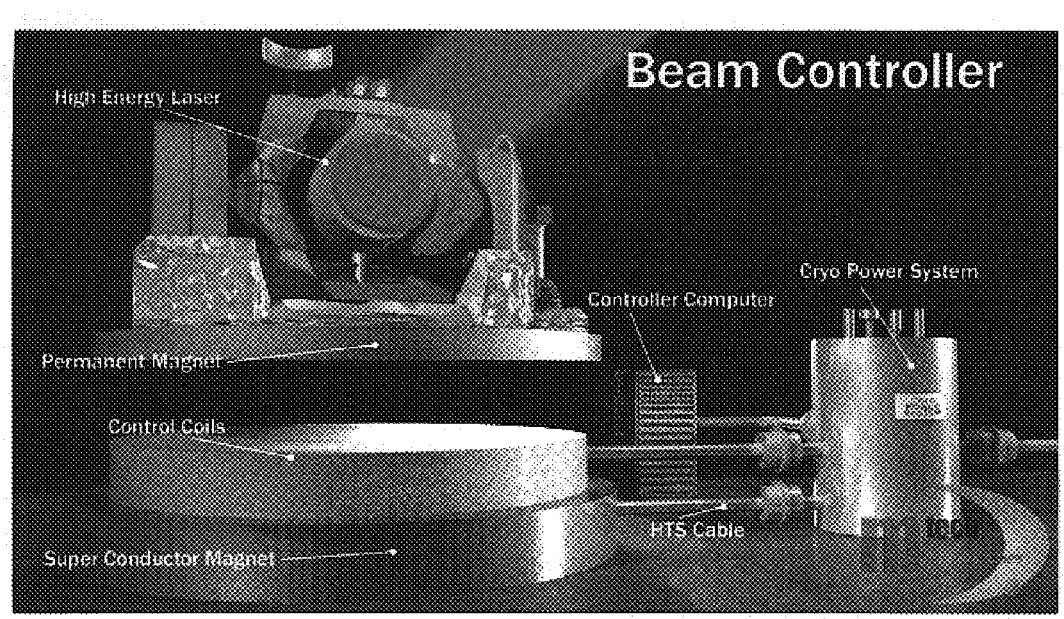
FIG. 2 shows an artist's rendition of the levitated beam controller. The levitated portion on the left could comprise either a beam controller only or a complete laser system. The superconducting levitation coils are controlled by the Cryopower system on the right.
Figure 3:
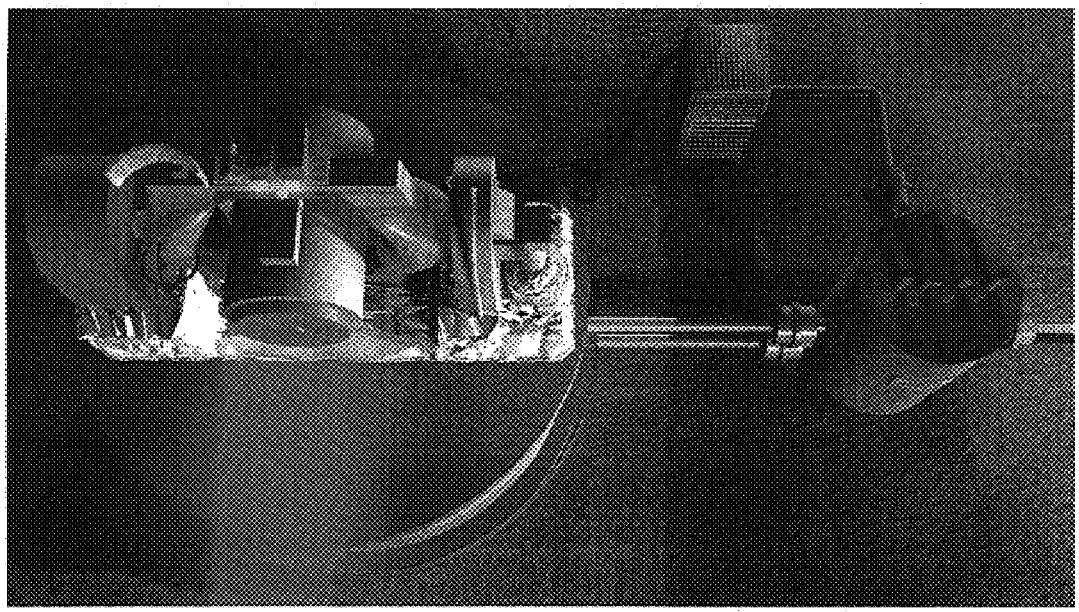
FIG. 3 shows a top view of the magnetically levitated laser system.

The preferred embodiment is as follows: A primary apparatus 1 containing a permanent, superconducting, or normal magnet 3 is levitated above and by a base 5 containing control and stabilization coils 4, which can be superconducting or not. The primary apparatus houses a high-power laser 14 or other device that requires mechanical stability in a vibrating or otherwise moving environment. A sensor 18 is used to monitor the position and motion of the primary apparatus 1, and a control computer 10 is used to adjust the currents in the control coils 4, which in turn alters the magnetic fields produced by the control coils 4, allowing for movement or stabilization of the primary apparatus 1. Connections are made with appropriate cables 6, 7, 9, and 17. A power source 8 supplies the current to the control coils 4, and can supply power to the primary apparatus 2. A cooling means 13 can be a cryogenic refrigerator, which can be used to cool the control coils 4, if these are superconducting coils. The cooling means 13 can also be used to cool the primary apparatus 1, if this contains a device, such as a semiconductor laser, whose performance is enhanced by cooling. The primary apparatus 1 can have up to six degrees of freedom 16, including three translational and three rotational. The base 5 can also contain a larger magnet used to produce the main field, and the control coils 4 can be used to make slight adjustments to this main field.

In a first version of the above embodiment, the primary apparatus 2 contains its own power source 15, and/or its own controlling means 15 (via radio transmissions or an on-board computer), and/or its own cooling means 15. In that case, the cables 11 and 12 shown in FIG. 1 are not required.

In a second version of the above embodiment, the primary apparatus 2 is connected to the external power source 8 through a cable 11, and/or to the external cooling means 13 through connection means (not shown), and/or to the external control computer 10 through a cable 12.

One embodiment contains as many cryogenic or superconducting parts as possible, and the control computer 10 and the power source 8 both contain cryogenic power components, including cryogenic MOSFETs, IGBTs, IGCTs, capacitors, inductors, etc.

The invention claimed is:
1. A stabilized magnetic levitation system comprising:
a primary apparatus containing a magnet, said primary apparatus being a photon emitter,
a base containing control coils producing a magnetic field used to levitate said primary apparatus, the strength and shape of said magnetic field being variable by adjusting an electrical current flowing through said control coils,
a computer monitoring said strength and shape of said magnetic field and the position and motion of said primary apparatus relative to an object separate from said primary apparatus and said base, and said computer determining and adjusting said current flowing through said control coils to maintain a stable physical relationship between said primary apparatus and said separate object.

2. The system of claim 1, wherein said primary apparatus requires physical rotation, said physical rotation being achieved by said computer adjusting the current in said control coils.

3. The system of claim 1, wherein said primary apparatus requires physical translation along an axis, said physical translation being achieved by said computer adjusting the current in said control coils.

4. The system of claim 1, wherein said magnet is selected from the group consisting of superconducting magnets, permanent magnets, or normal magnets.

5. The system of claim 1, wherein said control coils are one of superconducting coils and copper coils.

6. The system of claim 1, further comprising cooling means including at least one of a heat sink, a refrigeration unit, a water cooling system, a storage tank filled with a cryogenic fluid, and a cryogenic cooler.

7. The system of claim 6, wherein said cooling means cools said control coils, said control coils being at least one of superconducting coils and copper coils.

8. The system of claim 6, wherein said cooling means cools said primary apparatus for performance enhancement.

9. The system of claim 1, further comprising a power source providing said current flowing through said control coils, said power source being a cryogenically operated electrical circuit, and said current is supplied to said control coils through a superconducting cable.

10. The system of claim 9 wherein said cryogenically operated electrical circuit utilizes cryogenic electronic components including at least one of MOSFETs, IGBTs, IGCTs, diodes, ETOs, SETOs, cryogenic capacitors, cryogenic inductors, cryogenic switching modules, and superconducting components.

11. The system of claim 6, wherein said computer is cooled for enhanced performance, and wherein cooling is provided by said cooling means.

12. The system of claim 1, wherein said primary apparatus is powered by at least one of a self-contained fuel cell and a self-contained battery, and wherein said primary apparatus includes its own cooling means.

13. A stabilized magnetic levitation system comprising:
a primary apparatus containing a magnet,
a base containing control coils producing a magnetic field used to levitate said primary apparatus, the strength and shape of said magnetic field being variable by adjusting an electrical current flowing through said control coils,
a computer monitoring said strength and shape of said magnetic field and the position and motion of said primary apparatus relative to an object separate from said primary apparatus and said base, and said computer determining and adjusting said current flowing through said control coils to maintain a stable physical relationship between said primary apparatus and said separate object,
further comprising cooling means and a power source, wherein said primary apparatus is connected to at least one of said cooling means, said computer, and said power source via lightweight, flexible cables.

14. A stabilized magnetic levitation system comprising:
a primary apparatus containing a magnet,
a base containing control coils producing a magnetic field used to levitate said primary apparatus, the strength and shape of said magnetic field being variable by adjusting an electrical current flowing through said control coils,
a computer monitoring said strength and shape of said magnetic field and the position and motion of said primary apparatus relative to an object separate from said primary apparatus and said base, and said computer determining and adjusting said current flowing through said control coils to maintain a stable physical relationship between said primary apparatus and said separate object,
wherein said primary apparatus requires mechanical stability, said base being subject to mechanical disturbances, said mechanical stability being achieved by said computer adjusting the current in said control coils in response to said disturbances, and wherein said primary apparatus includes a photon emitter.

15. The system as in claim 14, wherein said separate object has motion, said photon emitter aims at and tracks said object in its motion.

16. The system as in claim 14, wherein said primary apparatus requires physical rotation, said physical rotation being achieved by said computer adjusting the current in said control coils.

17. The system as in claim 14, wherein said primary apparatus requires physical translation along an axis, said physical translation being achieved by said computer adjusting the current in said control coils.

18. The system as in claim 16, wherein said primary apparatus requires physical translation along an axis, said physical translation being achieved by said computer adjusting the current in said control coils.

* * * * *